United States Patent [19]
Lulofs

[11] Patent Number: 5,943,470
[45] Date of Patent: Aug. 24, 1999

[54] LOW-VOLTAGE GENERATION IN MAINS-POWERED HOT-AIR APPLIANCES HAVING A FAN MOTOR

[75] Inventor: Klaas J. Lulofs, Drachten, Netherlands

[73] Assignee: U.S. Philips Corporation, New York, N.Y.

[21] Appl. No.: 08/957,800

[22] Filed: Oct. 24, 1997

[30] Foreign Application Priority Data

Oct. 28, 1996 [EP] European Pat. Off. .............. 96202993

[51] Int. Cl.⁶ .................................................. A45D 20/10
[52] U.S. Cl. ......................... 392/385; 392/383; 392/384; 392/365
[58] Field of Search ................................. 392/379–385, 392/360, 365–369; 34/96–97

[56] References Cited

U.S. PATENT DOCUMENTS

| | | |
|---|---|---|
| 3,497,675 | 2/1970 | Yoshiike et al. ......................... 392/365 |
| 4,003,388 | 1/1977 | Nopanen . |
| 4,085,309 | 4/1978 | Godel et al. ............................. 395/384 |
| 4,323,761 | 4/1982 | Hubner . |
| 4,327,278 | 4/1982 | Tomaro . |
| 4,769,572 | 9/1988 | Voigt ....................................... 392/383 |
| 5,434,946 | 7/1995 | Barzilai et al. . |

FOREIGN PATENT DOCUMENTS

| | | |
|---|---|---|
| 3139199 | 4/1983 | Germany . |
| 3234012 | 3/1984 | Germany . |
| 3302609 | 8/1984 | Germany . |
| 1466642 | 11/1974 | United Kingdom . |

*Primary Examiner*—Teresa Walberg
*Assistant Examiner*—Vinod D Patel
*Attorney, Agent, or Firm*—Ernestine C. Bartlett; Leroy Eason

[57] ABSTRACT

A hot-air appliance comprises a fan motor connected in series with a heating element to receive a.c. mains voltage. The alternating voltage across the motor is rectified and serves to power additional electronic circuits in the appliance.

4 Claims, 2 Drawing Sheets

LOW-VOLTAGE GENERATION IN MAINS-POWERED HOT-AIR APPLIANCES HAVING A FAN MOTOR

BACKGROUND OF THE INVENTION

The invention relates to a hot-air appliance comprising: a heating element and a motor connected in series to receive a.c. mains voltage.

SUMMARY OF THE INVENTION

Such a hot-air appliance is known, inter alia from U.S. Pat. No. 4,323,761. Such hot-air appliances are used as hair dryers, hot-air brushes or combs, and hair-drying hoods for personal care and in fan heaters for space heating. The motor of the fan producing the stream of hot air is arranged in series with one of the heating elements. Alternatively, the motor can be connected to a tapping of the heating element, as in the case of said United States Patent. The motor can be an a.c. motor but frequently a d.c. motor is used. In the last-mentioned case the motor is connected to the heating element via a diode or a rectifier bridge. Such hot-air appliances often include electronic circuits for temperature control, for the processing of sensor signals, or for control and signalling purposes. For powering such electronic circuits a direct voltage is required which is comparatively low with respect to the a.c. mains voltage.

UK Patent Specification GB 1 467 642 discloses a hot-air comb in which a comparatively low direct voltage is generated by means of a transformer and a rectifier bridge. However, the transformer which converts the a.c. mains voltage to a low alternating voltage is an expensive and heavy component.

Another known solution is the use of a resistor for reducing the voltage. However, in view of the dissipation this solution is only feasible if the current consumed by the electronic circuits is not too large. An alternative is the use of a capacitor as a non-dissipating series element. Also in this case the current is again a limiting factor if restrictions are imposed on the dimensions of the capacitor.

Consequently, there is a need for a cheap and simple solution for the generation of low voltages for electric circuits in hot-air appliances. To this end, the hot-air appliance of the type defined in the opening paragraph is characterized in that the hot-air appliance further comprises: a rectifier for rectifying an alternating voltage across the motor.

The alternating voltage across the motor is rectified and used for powering the electronic circuits. The current through the motor is generally much larger than the current for the electronic circuits, as a result of which the operation of the series arrangement comprising the heating element and the motor is hardly affected. However, it is also possible to allow for the individual current consumption of the electronic circuits and the motor when choosing the resistance value of the heating element.

BRIEF DESCRIPTION OF THE DRAWINGS

These and other aspects of the invention will be described and elucidated with reference to the accompanying drawings, in which.

In these Figures parts having like functions or purposes bear the same reference symbols.

DESCRIPTION OF THE PREFERRED EMBODIMENTS

Figure 1:
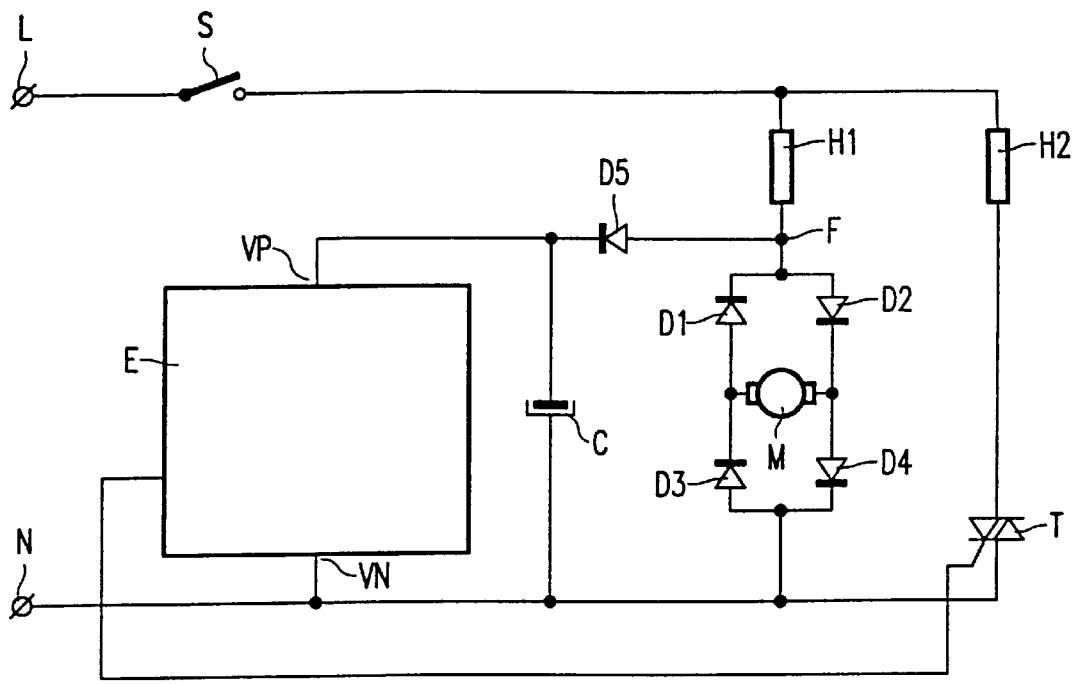
FIG. 1 shows a circuit diagram of a first embodiment of a hot-air appliance in accordance with the invention.

FIG. 1 shows a circuit diagram of an embodiment of a hot-air appliance in accordance with the invention. The appliance receives a.c. mains voltage on the mains voltage terminals L and N and is switched on by means of a power switch S in series with the mains voltage terminal L. The hot air is produced by a first heating element H1 connected in series with a fan motor M to the mains voltage terminals L and N. In the present case the motor M is, by way of example, a d.c. motor connected via a rectifier bridge comprising the diodes D1 through D4. However, instead of a d.c. motor with a rectifier bridge it is also possible to use an a.c. motor. The alternating voltage across the motor, in the present case the alternating voltage across the rectifier bridge D1–D4, is rectified by means of a rectifier diode D5 and a smoothing capacitor C. For this purpose, the rectifier diode D5 has its anode connected to the node F between the first heating element H1 and the rectifier bridge D1–D4. The rectifier diode D5 has its cathode connected to the positive terminal of the smoothing capacitor C. The negative terminal of the smoothing capacitor C and the rectifier bridge D1–D4 are further connected to the mains voltage terminal N. The direct voltage across the smoothing capacitor C functions as a supply voltage for an additional electronic circuit E, which has its positive supply terminal VP and its negative supply terminal VN respectively connected to the positive and the negative terminal of the smoothing capacitor C. The hot-air appliance further comprises a second heating element H2 connected in series with a triac T across the mains voltage terminals L and N. The first heating element H1 produces the primary heat and the second heating element H2 produces additional heat controllable by means of the triac T. The control circuits for the gate of the triac T are included in the electronic circuit E, which also incorporates optional circuits for sensors and control functions. In view of the control of the gate of the triac T it is favourable to connect the negative supply terminal VN of the electronic circuit E, the negative terminal of the smoothing capacitor C, the diodes D3 and D4 of the rectifier bridge D1–D4, and that one of the main electrode of the triac T which is not connected to the second heating element H2, all to the same mains voltage terminal N.

The diode D5 can also be poled oppositely, i.e. with the cathode to the node F and the anode to the negative terminal of the smoothing capacitor C, in which case the positive terminal of this capacitor should be connected to the mains voltage terminal N. In this way, a supply voltage will be generated which is negative with respect to the mains voltage terminal N. It is alternatively possible to generate a positive and also a negative supply voltage by means of two rectifier diodes and two smoothing capacitors.

Figure 2:
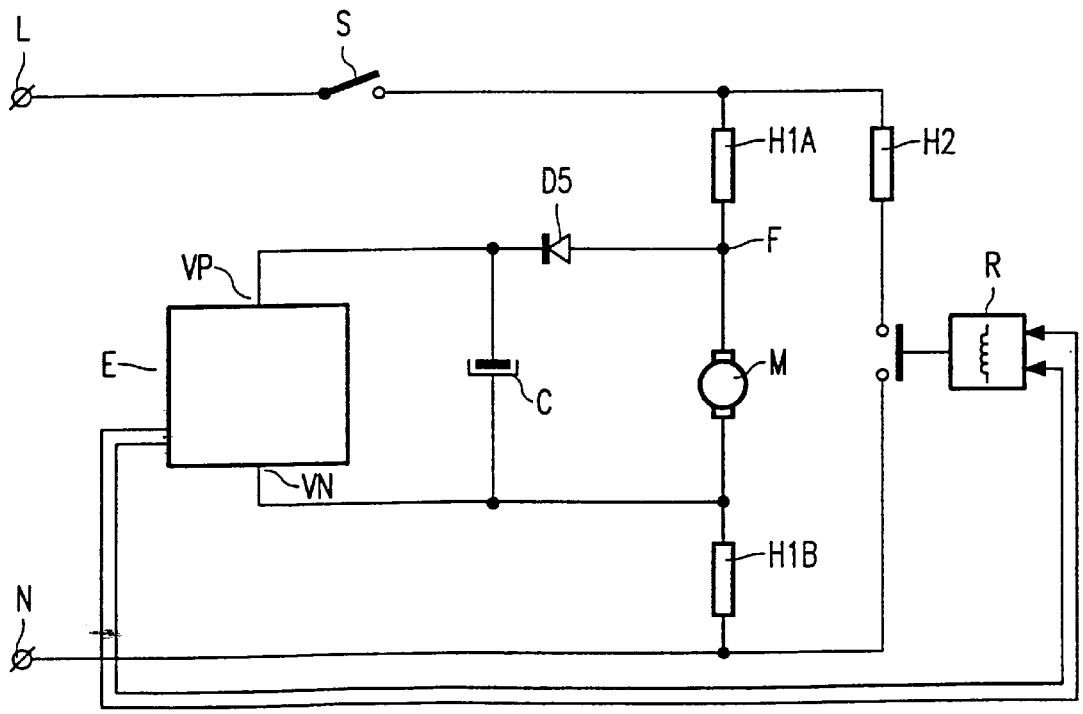
FIG. 2 shows a circuit diagram of a second embodiment of a hot-air appliance in accordance with the invention.

FIG. 2 shows a variant in which an a.c. motor M is connected to the mains voltage terminal L via a first section H1A of the first heating element H1, and to the mains voltage terminal N via a second section H1B of the first heating element H1. Instead of an a.c. motor it is possible to use a d.c. motor with a rectifier bridge. The alternating voltage across the motor M is again rectified with the rectifier diode D5 and the smoothing capacitor C. The positive supply terminal VP and the negative supply terminal VN of the electronic circuit E are again connected to the positive and the negative terminal of the smoothing capacitor C. The negative supply terminal VN of the electronic circuit E is now floating with respect to the mains voltage terminal N. This need not be a problem if the second heating element H2 is turned on and turned off by means of a relay R which is energized by the electronic circuit E.

Figure 3:
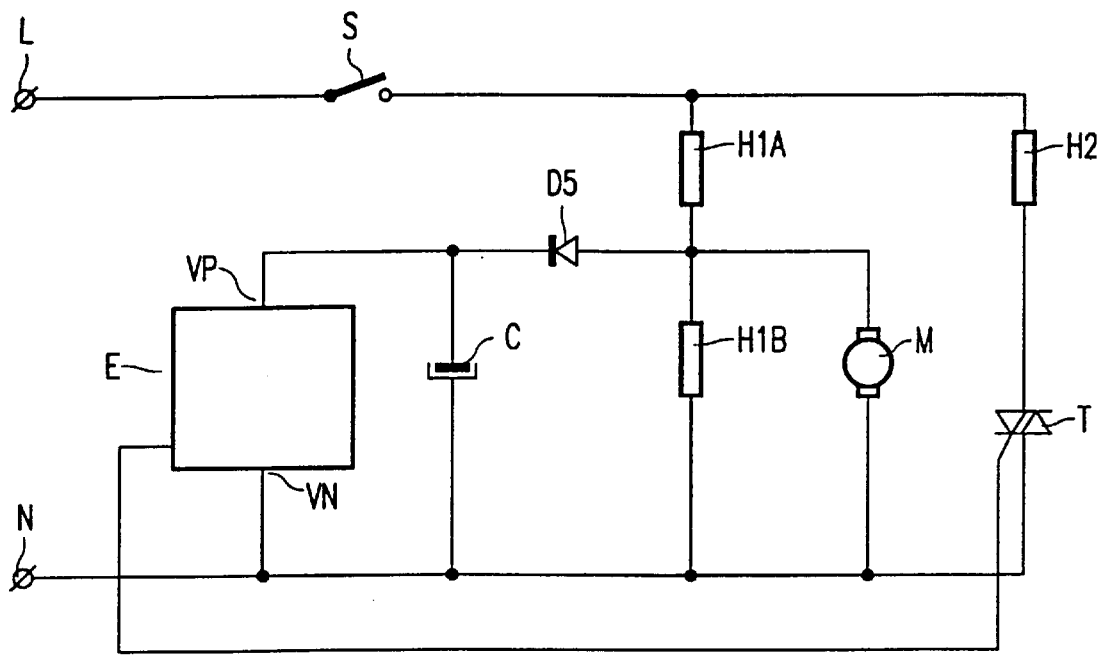
FIG. 3 shows a circuit diagram of a third embodiment of a hot-air appliance in accordance with the invention.

FIG. 3 shows a variant in which the a.c. motor M is connected to a tapping of the first heating element H1, which for this purpose again comprises a first section H1A and a second section H1B connected in series between the mains voltage terminals L and N. Consequently, the a.c. motor M, which can again be replaced by a d.c. motor in conjunction with a rectifier bridge, need not be arranged in series with the entire first heating element H1 but can instead be connected to a section of the first heating element H1.

Figure 4:
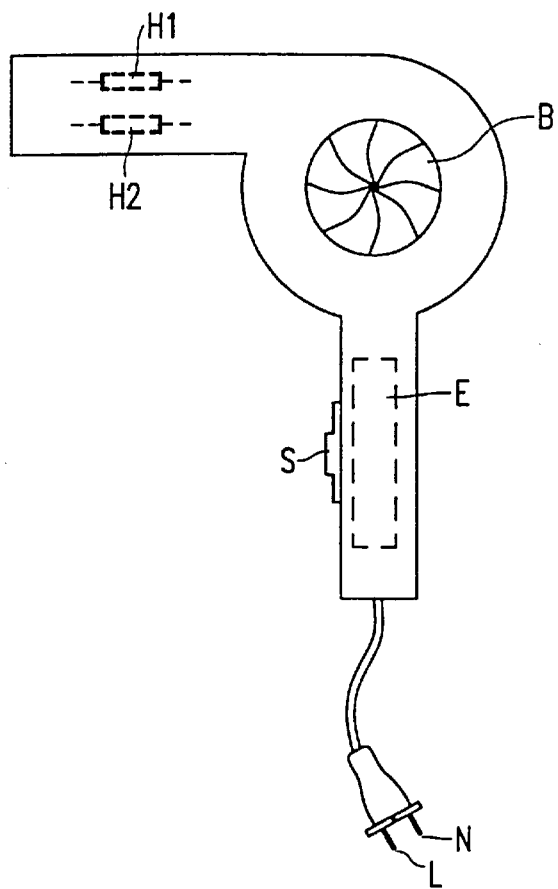
FIG. 4 is an elevation showing a hair dryer in accordance with the invention.

FIG 4 diagrammatically shows a hair dryer including the heating elements H1 and H2, a fan B, a power switch S, and an electronic circuit E accommodated in the handle.

I claim:

1. A hot-air appliance comprising: a first heating element and a motor connected in series to receive a.c. mains voltage; and a rectifier connected across said motor; said rectifier being in the form of a series arrangement of a diode and a smoothing capacitor, for rectifying an alternating voltage across the motor.

2. A hot-air appliance as claimed in claim 1, wherein the hot-air appliance also includes an electronic circuit arranged in parallel with the smoothing capacitor to receive therefrom a d.c. supply voltage.

3. A hot-air appliance as claimed in claim 2, wherein the hot-air appliance further includes: a second heating element which, in series with an electronic switch, is connected to receive the a.c. mains voltage, said first heating element and the further heating element being connected to a first mains voltage terminal, and the motor, the smoothing capacitor, the electronic circuit and the electronic switch being connected to a second mains voltage terminal.

4. A hot-air appliance as claimed in claim 1, wherein the motor is a d.c. motor connected to said a.c. mains voltage via a rectifier bridge.

* * * * *